Dec. 6, 1927.  
J. B. BORGADT  
1,651,438  
ELECTROMAGNETIC CURRENT CONTROL FOR WELDING MACHINES  
Original Filed Oct. 2, 1925   3 Sheets-Sheet 1
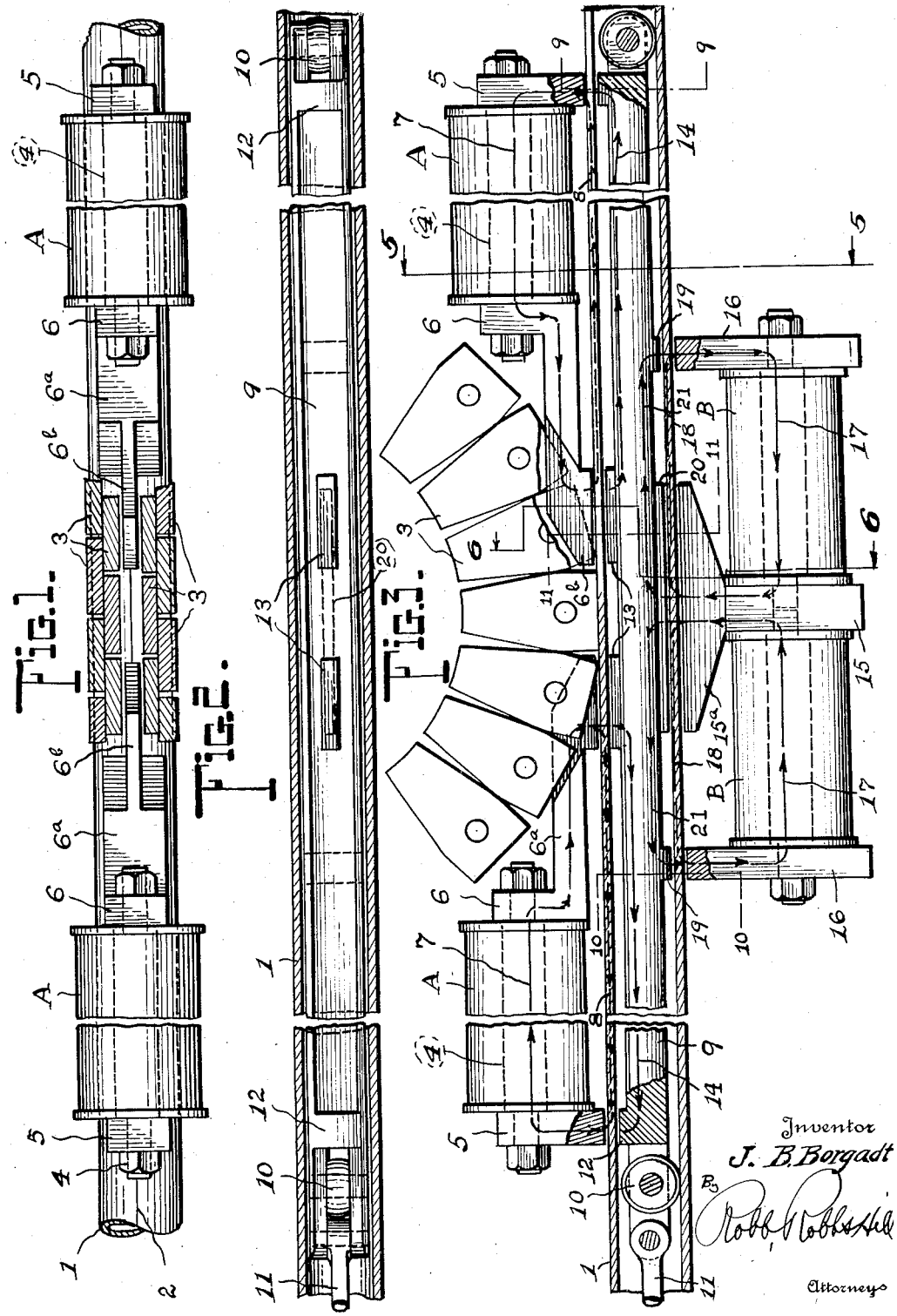
Inventor  
J. B. Borgadt  
Attorneys

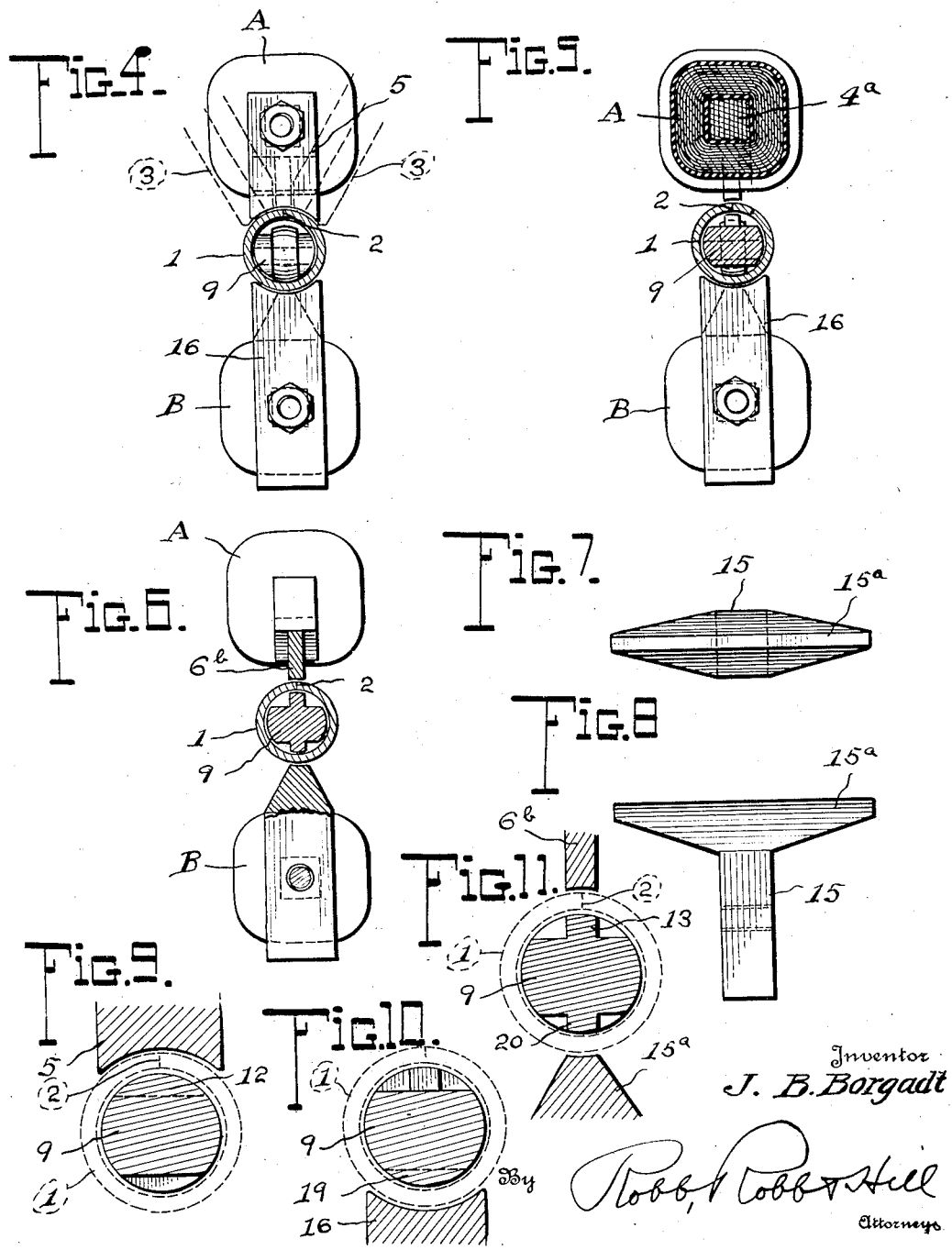

Dec. 6, 1927.
J. B. BORGADT
1,651,438
ELECTROMAGNETIC CURRENT CONTROL FOR WELDING MACHINES
Original Filed Oct. 2, 1925   3 Sheets-Sheet 3
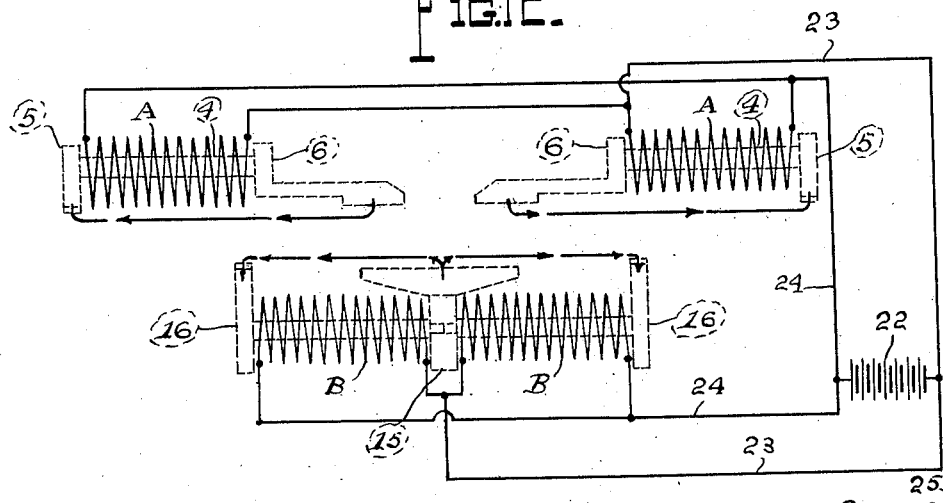
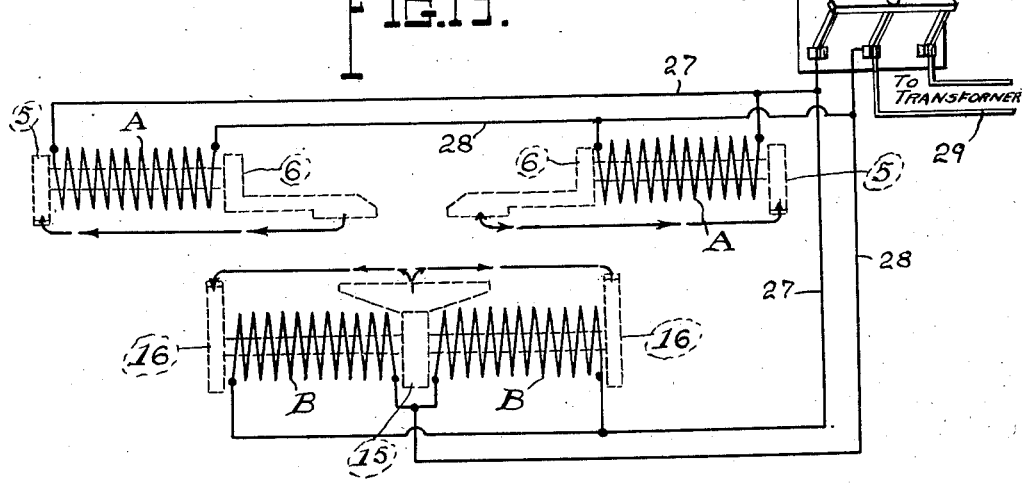
Inventor
J. B. Borgadt
By Robb, Robb & Hill
Attorneys Patented Dec. 6, 1927.

1,651,438

UNITED STATES PATENT OFFICE.

JOHN B. BORGADT, OF CLEVELAND, OHIO.

ELECTROMAGNETIC-CURRENT CONTROL FOR WELDING MACHINES.

Application filed October 2, 1925, Serial No. 60,019. Renewed January 31, 1927.

The present invention relates in general to an electric welding machine and has for its object to provide a device of this character which embodies novel features of construction, whereby an electro-magnetic flux is utilized for causing the electric welding current to travel along desired paths and to reduce the wastage of current along undesirable paths in the article being welded.

The invention also contemplates the provision of electro-magnetic means of the above mentioned character, which can be used successfully in connection with non-ferrous tubes or articles, such as those formed of copper, aluminum, nickel and the like as well as with ferrous articles.

Further objects of the invention are to provide an electro-magnetic current control device for welding machines which is comparatively simple and inexpensive in its construction, which operates in an effective manner to cause the electric welding current to travel in the desired paths so that wastage of the current is reduced and a strong weld obtained, which can be used with either a direct or alternating current, and which can be associated with many of the conventional electric welding machines.

One particular embodiment of the invention will be shown and described in detail for illustrative purposes, although it will be understood that many modifications and changes can be made in the details of construction without departing from the spirit of the invention.

For a full understanding of the invention reference is to be had to the following description and accompanying drawings, in which Figure 1 is a top plan view of an electromagnetic current control device which is constructed in accordance with the invention, showing the same as applied to a tube welding machine, the contact shoes or electrodes of the wheels for engaging the tube on opposite sides of the joint to be welded being shown in section.

Figure 2 is a longitudinal sectional view through the tube which is to be welded, showing a core member in position therein which is used in connection with non-ferrous tubes.

Figure 3 is a side elevation of the tube welding machine, portions being broken away and shown in section.

Figure 4 is an end view of the welding device with the electrode wheels indicated by dotted lines.

Figure 5 is a transverse sectional view taken on the line 5—5 of Figure 3, and showing the laminated construction of the magnetic core which is used when the device is constructed for use with an alternating current.

Figure 6 is a transverse sectional view on the line 6—6 of Figure 3, the electrode wheels being omitted.

Figures 7 and 8 are top and side elevations, respectively, of the intermediate shoe of the lower electro-magnet.

Figure 9 is an enlarged sectional view on the line 9—9 of Figure 3.

Figure 10 is an enlarged sectional view on the line 10—10 of Figure 3.

Figure 11 is an enlarged sectional view on the line 11—11 of Figure 3.

Figure 12 is an electric wiring diagram showing the circuits as they are arranged when direct current is used.

Figure 13 is a similar view showing the electric connections and circuits where an alternating current is used.

Corresponding and like parts are referred to in the following description and indicated on all of the views of the drawings by like reference characters.

Referring to the drawings, which illustrate one particular embodiment of the invention, the reference numeral 1 designates a tube which is formed by transversely bending a strip of sheet metal and which has a joint 2 extending longitudinally along the top thereof which is to be welded as the tube passes through the machine. The tube is engaged on opposite sides of the joint 2 by the electrodes or contact shoes 3 of current conducting wheels, said wheels being in electrical connection with opposite terminals of the welding circuit so that the electric current passes through the portion of the tube between the contact wheels, thereby welding the joint in the usual well known manner. The contact wheels may be of any suitable or conventional construction, although in the present instance the electrodes 3 are shown as of the type which is used in the contact wheels shown by Patent No. 1,580,401, which was granted to me on April 13, 1926. With the usual tube welding machine a material portion of the welding current follows the tube walls around the bottom thereof and along the axis of the tube, and this part of the welding current is not only useless for the purpose of welding the joint of the tube, but may have a destructive action upon the metal of the tube, this being especially true in certain non-ferrous tubes. It may be roughly estimated that when welding a ferrous tube about twenty-five percent of the electric welding current follows paths around the bottom and along the top of the tube and is wasted and that in welding non-ferrous tubes as high as sixty percent of the welding current is frequently wasted in this manner.

The purpose of the present invention is to reduce this wastage and possible destructive action of part of the electric welding current by utilizing the property of an electro-magnetic flux to divert and impede the current when set up in a direction at right angles to the flow of the current. An electro-magnet A is arranged above the tube 1 just in advance of the point where the tube is engaged by the current conducting electrodes 3, and a similar magnet is arranged over the tube just to the rear of the point where the tube is engaged by the electrodes 3 and the welding takes place. The core 4 of each of the electro-magnets A has a shoe 5 applied to the end thereof which is remote from the electrodes 3, said shoe extending downwardly and terminating in an end which is curved to correspond to the curvature of the tube and has a slightly spaced relation thereto, as indicated by Figure 9. The opposite end of the core 4 of each of the electro-magnets A is provided with a shoe 6 having a longitudinally extending arm 6$^a$ terminating in a blade 6$^b$ which projects between the two sets of electrodes 3 and extends downwardly into close proximity with the top of the tube 1. When an electric current is caused to flow through these electro-magnets A a flux is established which follows the paths indicated by the lines 7 extending through the core and shoes and the lines 8 extending through the upper walls of the tube.

In the event the tube to be welded is formed of some non-ferrous metal such as copper, aluminum, nickel or the like, a core or rod 9 is arranged on the inside of the tube. Opposite ends of the core are provided with wheels 10 which support the core in position within the tube with a minimum amount of friction, and one end of the core is connected to a rod 11 by means of which the core is held against movement. The ends of the core are provided with upward projections 12 which are arranged under the shoes 5 of the electro-magnets A, while the intermediate portion of the core is provided with upwardly extending wings 13 which are arranged under the corresponding blades 6$^b$ of the shoes 6 of the electro-magnets. When this core is used the electro-magnetic flux will flow through the core along the path indicated by the lines 14 instead of flowing through the walls of the tube along the path indicated by the dotted lines 8.

Arranged under the tube 1 at the place where the welding takes place is a pair of electro-magnets B, B which are in an end to end relation, having a common intermediate shoe 15. The outer end of each magnet B is provided with a shoe 16 which projects upwardly and has the end thereof curved to correspond to the curvature of the tube 2, as indicated by Figure 10. The intermediate shoe 15 has an upwardly extending blade 15$^a$ which is elongated longitudinally of the tube and terminates in an edge which is normally in a slightly spaced relation to the bottom wall of the tube. When these magnets B, B are energized an electro-magnetic flux is produced which travels through the cores of the magnets and the shoes thereof along the paths indicated by the lines 17, and also travels through the lower walls of the tube B along the paths indicated by the dotted lines 18. In the event the tube is formed of some non-ferrous metal the core 9 is used. This core is provided with downwardly extending projections 11 which are arranged just above the shoes 16 of the magnets B. The core is also formed with a downwardly extending wing 20 which extends along the interior of the tube just above the elongated blade 15$^a$ of the intermediate shoe 16. When this core is used the magnetic flux instead of flowing through the lower walls of the tube, flows through the core along the paths indicated by the lines 21.

The magnetic flux which is caused to flow through the lower wall of the tube longitudinally thereof and throughout the entire distance between the end shoes 16 of the magnets B, B operates to reduce the amount of welding current which flows around the bottom of the tube and is wasted. In a similar manner the flux which is caused to flow through the upper portion of the tube 1 by the electro-magnets A tends to reduce and divert the welding current flowing across the top of the tube at points too far in advance of the joint where the welding action takes place, or too far to the rear of said joint as to be without beneficial results. The effective action of the magnetic flux of the several magnets is to concentrate the electric welding current at the point where the welding action takes place and reduce the wastage of the welding current and divert it into useful paths. In the operation of the device the tube 1 is fed forward under the electrodes 3 at a suitable speed and the said electrodes or contact members first come into contact with the tube at a point at one side of the blade 6$^b$ of the magnet A which is arranged in advance of the electric contact wheels. The flux set up at this point prevents any appreciable burning and there is no destructive spark or fusing action. As the tube continues to move it remains in engagement with the contact members 3 of the conducting wheels as it passes through the space between the blades 6^b of the two upper magnets. The contact shoes then engage the tube with a maximum pressure and the full strength of the current is caused to pass across the joint at this point with the result that a strong and effective weld is obtained. A continued movement brings the contacts 3 upon opposite sides of the blade 6^b of the magnet A which is arranged to the rear of the point of welding and the contacts are lifted away from the tube at this point without any appreciable spark or heating. In this manner a continuous butt weld is obtained and any weldable and bendable material can thus be transformed from sheet metal strips into electrically welded tubes and pipes.

A wiring diagram which can be used when a direct current is employed is illustrated by Figure 12. The numeral 22 designates a source of electrical supply having one terminal thereof connected by lead wires 23 to one end of each of the magnets, the opposite end of each of the magnets being connected by lead wires 24 to the other terminal of the source of electrical supply. The current is caused to flow through the upper magnets A, A in such a direction that the inner shoes thereof are of the same magnetic polarity. In a similar manner the electric current is caused to flow through the two lower magnets B, B in such a direction that the inner ends thereof have the same magnetic polarity.

A wiring diagram for use with an alternating current is shown by Figure 13. In an alternating current circuit the current and magnetic flux are not constant, but gradually increase in a positive direction from zero to a maximum then decrease from the maximum back to zero, and subsequently in a negative direction increase gradually from zero to a maximum, and decrease from the maximum to zero, this process being repeated many times a second. The changes in the magnetic flux do not synchronize with the changes in the current, and it is well known that there is a lagging in the changes in the flux. In order that the changes in the flux may synchronize with the changes in the welding current the circuits of the electro-magnets are connected to different phases of the alternating current circuit. In a three-phase circuit the three phases are 120 electrical degrees apart, so that by connecting the welding current, i. e. the transformer, to one phase and the electric control magnets to another phase, the welding current and the controlling magnetic flux nearly synchronize, each reaching a maximum and zero value at approximately the same instant. On Figure 13 the alternating current supply wires are shown at 25 and the switch at 26. Lead wires 27 extend from one of the end terminals of the switch 26 to one end of each of the control magnets, while lead wires 28 extend from the middle terminal of the switch to the opposite end of each of the control magnets. The wires 29 which lead to the transformer are connected to the other end terminal of the switch and the middle terminal of the switch. This provides for connecting the transformer and control magnets to different phases of the alternating current circuit, so that the welding current and the magnetic flux of the magnets will nearly synchronize, reaching maximum and zero values at approximately the same instant. When an alternating current is used the magnet cores have a laminated formation, as indicated at 4^a on Figure 5.

Having thus described my invention what I claim as new and desire to secure by Letters Patent is,

1. An electric welding machine including means for conveying the welding current to the article being welded, an electro-magnet arranged on one side of the article, and an iron core arranged on the other side of the article, the electro-magnet having shoes which project toward the article and the core being provided with corresponding projections whereby a magnetic flux is caused to flow through the article in such a way as to reduce and divert the flow of the welding current from undesirable paths.

2. An electric tube welding machine including contact members engaging the tube on opposite sides of the seam, and an electro-magnet arranged adjacent the tube and having an elongated shoe which extends along the seam for a distance approximately where the contact members engage or disengage on to the tube, said electro-magnet serving to create a magnetic flux through the tube to reduce and divert the flow of the welding current from undesirable paths.

3. An electric tube welding machine including contact members engaging the tube on opposite sides of the seam, and electro-magnets arranged opposite the seam both in advance and behind the point where the contact members engage the tube, said electro-magnets being formed with elongated shoes which extend between the contact members and terminate short of the welding zone between the contact members whereby magnetic flux is created through the tube to reduce and divert the flow of the welding current from undesirable paths.

4. An electric tube welding machine including contact wheels which have a rolling engagement with the tube on opposite sides of the seam as the tube is advanced, electromagnets extending longitudinally of the tube and arranged adjacent the seam both in advance of and behind the point where the tube is engaged by the contact wheels, said electro-magnets having elongated shoes which project between the contact wheels and terminate short of the welding zone between the seam, whereby the magnets create a magnetic flux through the tube to reduce and divert the flow of the welding current from undesirable paths and concentrate it at the welding zone.

5. An electric tube welding machine including contact wheels having a rolling engagement with the tube on opposite sides of the seam as the tube is advanced, and a pair of longitudinally extending electro-magnets arranged adjacent the tube on the opposite side thereof, said electro-magnets having a common intermediate shoe and independent end shoes which project toward the tube whereby a magnetic flux is caused to flow through the tube at a point opposite the welding zone to reduce and divert the welding current flowing around the tube.

6. An electric tube welding machine including contact wheels having a rolling engagement with the tube on opposite sides of the same as the tube is advanced, electro-magnets extending longitudinally of the tube and arranged over the seam both in advance of and to the rear of the contact rolls, said electro-magnets having elongated shoes which extend between the contact wheels and terminate short of the welding zone between the same, and a longitudinally extending electro-magnet arranged adjacent to the tube at a point opposite the seam and welding zone, said electro-magnets serving to create magnetic fluxes which flow through the tube and reduce and divert the flow of the welding current from undesirable paths.

7. An electric welding machine including contact members engaging the work on opposite sides of the seam to be welded, an electro-magnet arranged adjacent the work for creating a magnetic flux to reduce and divert the flow of the welding current from undesirable paths, a source of supply for a multi-phase alternating current, means for connecting the electro-magnet to one phase of the alternating current, and means for connecting the contact members to another phase of the alternating current whereby the magnetic flux and welding current will nearly synchronize.

8. An electric welding machine including contact members adapted to engage the work on opposite sides of the seam to be welded, an electro-magnet arranged adjacent the work for creating a magnetic flux tending to divert the flow of welding current from undesirable paths, and means for connecting the electromagnet to one phase of an alternating current, whereby the magnetic flux induces a current opposing the welding current which is connected to another phase of said alternating current.

9. An electric welding machine including means for conveying the welding current to the article being welded, an electro-magnet arranged on one side of the article, and an unmagnetized iron core arranged on the other side of the article in cooperative relation to the electro-magnet, whereby a magnetic flux is caused to flow through the article to reduce and divert the flow of the welding current from undesirable paths.

10. An electric tube welding machine designed for continuous operation and including means for directing the tube to be welded through the machine, means for conveying the welding current to the tube, an iron core arranged within the hollow interior of the tube at the welding zone, and an electro-magnet arranged on the outside of the tube at a point remote from the seam and in cooperative relation with the core, whereby a magnetic flux is caused to flow through the article in such a way as to reduce and divert the flow of the welding current from passing around the back of the tube.

11. An electric tube welding machine designed for continuous operation and including means for directing the tube through the machine, contact members engaging the tube on opposite sides of the seam, and electro-magnets arranged adjacent the seam both in advance and behind the point where the contact members engage the tube, said electro-magnets serving to create a magnetic flux through the tube to assist in concentrating the current at the welding point and preventing it from spreading out in advance and behind the welding point.

12. An electric tube welding machine designed for continuous operation and including means for directing the tube through the machine, contact members engaging the tube on opposite sides of the same, an iron core extending through the hollow interior of the tube, electro-magnets extending longitudinally of the tube and arranged adjacent the seam both in advance of and behind the point where the tube is engaged by the contact members, and an electro-magnet arranged exteriorly of the tube at the back thereof opposite the welding point, said electro-magnets all cooperating with the iron core to create magnetic fluxes which assist in concentrating the flow of current through the tube at the welding point and preventing it from spreading out through other parts of the tube.

13. An electric tube welding machine designed for continuous operation and including means for directing the tube through the machine, contact members engaging the tube on opposite sides of the seam as the tube is advanced, electro-magnets extending longitudinally of the tube and arranged adjacent the seam both in advance of and to the rear of the point where the tube is engaged by the contact members, and a longitudinally extending electro-magnet arranged adjacent to the tube at a point opposite the seam and welding zone, said electro-magnets serving to create magnetic fluxes which flow through the tube and assist in concentrating the flow of the welding current through the tube at the welding point and preventing it from spreading out through other parts of the tube.

14. An electric tube welding machine designed for continuous operation and including means for directing the tube to be welded through the machine, contact members engaging the tube on opposite sides of the seam as the tube is advanced, and an electro-magnet arranged on the exterior of the tube and extending longitudinally thereof, said electro-magnet being located adjacent to the tube at a point opposite the seam and welding zone and serving to create a magnetic flux which flows through the tube and tends to prevent wasteful flow of the welding current around the back of the tube.

In testimony whereof I affix my signature.

JOHN B. BORGADT.